(12) United States Patent
Kakura et al.

(10) Patent No.: US 8,594,039 B2
(45) Date of Patent: Nov. 26, 2013

(54) REFERENCE SIGNAL MULTIPLEXING AND RESOURCE ALLOCATION

(75) Inventors: Yoshikazu Kakura, Tokyo (JP); Shousei Yoshida, Tokyo (JP); Takamichi Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 1040 days.

(21) Appl. No.: 11/841,021

(22) Filed: Aug. 20, 2007

(65) Prior Publication Data

US 2008/0049668 A1 Feb. 28, 2008

(30) Foreign Application Priority Data

Aug. 22, 2006 (JP) ................................. 2006-225932

(51) Int. Cl.
*H04W 4/00* (2009.01)
*H04B 7/216* (2006.01)
*H04J 3/00* (2006.01)
*H04W 72/00* (2009.01)
*H04B 7/00* (2006.01)

(52) U.S. Cl.
USPC ........... 370/330; 370/335; 370/326; 370/443; 455/451; 455/452.1; 455/509

(58) Field of Classification Search
USPC ......... 370/328–330, 335–344, 436, 441–443, 370/491; 455/451, 452.1, 509
See application file for complete search history.

(56) References Cited

U.S. PATENT DOCUMENTS

| 2007/0183386 A1* | 8/2007 | Muharemovic et al. ....... 370/344 |
| 2008/0123616 A1* | 5/2008 | Lee ................................. 370/344 |
| 2008/0219235 A1* | 9/2008 | Ma et al. ........................ 370/344 |
| 2009/0268695 A1* | 10/2009 | Zhao et al. .................... 370/336 |

FOREIGN PATENT DOCUMENTS

| CN | 1510953 | 7/2004 |
| EP | 1646163 | 4/2006 |
| JP | 2004-120730 | 4/2004 |
| JP | 2004-320738 | 11/2004 |
| JP | 2006-033778 | 2/2006 |
| JP | 2006-168476 | 6/2006 |

OTHER PUBLICATIONS

3GPP TSG-RAN WG1 Meeting #45 (R1-061193), Shanghai, China, May 12, 2006, Source: NTT DoCoMo, pp. 1-13.*
3GPP TSG RAN WG1 LTE Ad Hoc (R1-061840), Cannes, France, Jun. 30 2006, Source: CATT, pp. 1-5.*

(Continued)

*Primary Examiner* — Un C Cho
*Assistant Examiner* — Jeremy Costin
(74) *Attorney, Agent, or Firm* — Young & Thompson

(57) ABSTRACT

A reference signal of a user equipment to which a resource (LB#1) is allocated for a L1/L2 control signal, is allocated a resource (SB#1) that is closer on the time axis to the resource (LB#1), which the L1/L2 control signal is allocated, within the same frequency band as the L1/L2 control signal. A reference signal for CQI estimation, independent of a data signal and a L1/L2 control signal, is allocated a resource with which at least one of a reference signal for demodulation of a data signal and a reference signal for demodulation of a L1/L2 control signal is not transmitted at the same timing within the transmission band. The types of bandwidths of the reference signals multiplexed in a same short block within a same band are reduced, whereby restrictions as to the number of reference signal sequences that can be secured are diminished.

7 Claims, 10 Drawing Sheets

(56) References Cited

OTHER PUBLICATIONS

MC-CDMA and MC-DS-CDMA, 1 page.
Multiplexing including reference signal structure, Release 7, 3GPP TR 25.814 V2.0.0 (Jun. 2006), 3 pages.
R1-051033 Further Topics on Uplink DFT-SOFDM for E-UTRA, Agenda Item:8.2, 3GPPTSG RAN WG1 #42 bis, San Diego, USA, Oct. 10-14, 2005, 24 pages.
Japanese Official Action—2006-225932—Jun. 8, 2011.
CN Office Action dated May 25, 2011 with English Translation.
Extended European Search Report dated Jul. 13, 2011; Application No. 07075710.9.
NTT Docomo et al: Multiplexing Method for Orthogonal Reference Signals for E-UTRA Uplink, 3GPP TSG RAN WG1 LTE Ad Hoc, Cannes, France, Jun. 27-30, 2006.
LG Electronics: Uplink pilot for channel quality measurement, 3GPP TSG RAN WG1#44, R1-060538, Denver, USA, Feb. 13-17, 2006.
LG Electronics: Text proposal on uplink pilot for channel quality measurement, 3GPP TSG RAN WG1#44, Denver, USA, Feb. 13-17, 2006.
Huawei: Uplink Reference Signal Structure for E-UTRA, 3GPP TSG RAN WG1 LTE Ad Hoc, Cannes, France, Jun. 27-30, 2006.
3GPP TR 25.814: Physical layer aspects for evolved Universal Terrestrial Radio Access (UTRA) (Release 7).
Japanese Official Action—2006-225932—Oct. 5, 2011.
"Multiplexing Method for Orthogonal Reference Signals for E-UTRA Uplink", R1-061193, 3GPP TSG-RAN WG1 Meeting #45, May 12, 2006, URL, http://3gpp.org/ftp/tsg_ran/wg1_r11/TSGR1_45/Docs/R1-061193.zip.

\* cited by examiner

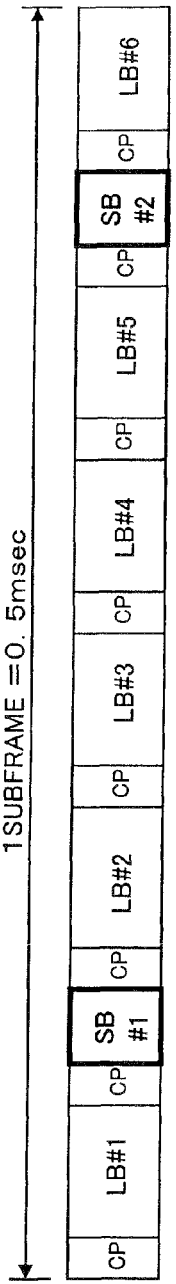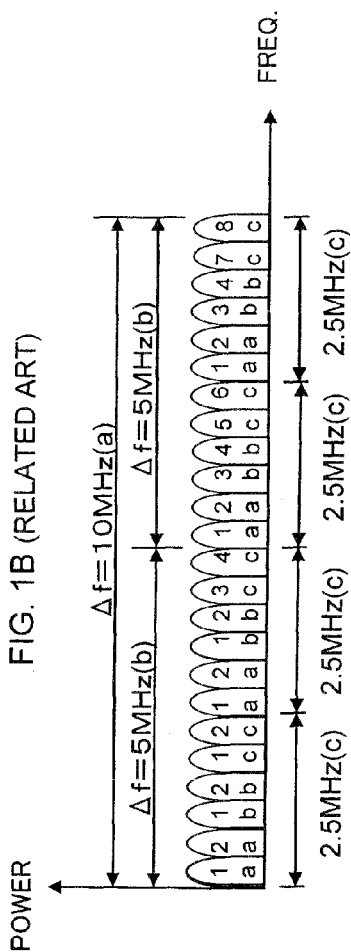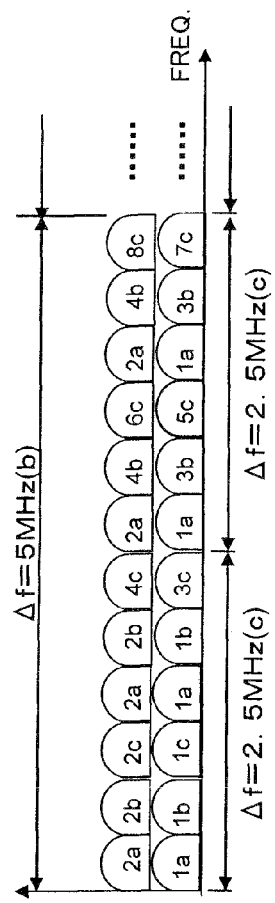

INDEPENDENT REF. SIGNAL COMMUNICATION

CONTROL SIGNAL COMMUNICATION

DATA TRANSMISSION

REFERENCE SIGNAL MULTIPLEXING AND RESOURCE ALLOCATION

BACKGROUND OF THE INVENTION

1. Field of the Invention

This application is based upon and claims the benefit of priority from Japanese Patent Application No. 2006-225932, filed on Aug. 22, 2006, the disclosure of which is incorporated herein in its entirety by reference.

The present invention relates to a radio communications system and, more particularly, to a radio communications system employing a scheme of multiplexing reference signals (also referred to as pilot signals) with transmission signals, as well as a technique for multiplexing reference signals, and radio communication equipment using the technique.

2. Description of the Related Art

In general, since transmission signals are under the influence of radio channel fading, radio communications systems employ a scheme of multiplexing a reference signal with a transmission signal. That is, a reference signal received is used to perform channel estimation for correct modulation/detection (hereinafter, "modulation/detection" will mean modulation, detection, or modulation and detection), and to perform channel quality (CQI: Channel Quality Indicator) measurement for link adaptation or scheduling.

Particularly in a mobile communications system in which a base station carries out channel-dependent scheduling for a plurality of mobile stations, since a resource is generally allocated to a mobile station exhibiting the best CQI, CQI measurement is performed in the entire frequency band where data may be transmitted, with respect to those mobile stations waiting for resource allocation. For CQI measurement, utilized is a reference signal multiplexed on an uplink that the base station receives from each mobile station. In the case where a reference signal for demodulation of an uplink data signal or uplink control signal is multiplexed, this reference signal can also be utilized for CQI measurement.

To perform channel estimation and the like by using a reference signal, the receiving side also needs to know in advance a reference signal sequence to be transmitted. For such a sequence, CAZAC (Constant Amplitude Zero Auto-Correlation) sequence has been attracting attention in recent years. The CAZAC sequence has the characteristics that the peak-to-average power ratio (PAPR) can be kept low because the amplitude is constant in time domain, and that excellent channel estimation in frequency domain is possible because the amplitude is constant also in frequency domain (for example, see Fazel, K., and Keiser, S., "Multi-Carrier and Spread Spectrum Systems," John Willey and Sons, 2003). Therefore, the CAZAC sequence is used as uplink reference-signal sequences also in the 3GPP Long Term Evolution (see 3GPP TR 25.814 v2.0.0, June, 2006).

Such a reference signal is periodically multiplexed in every frame so that variations due to channel fading can be accurately estimated. In general, for a single channel, a plurality of reference signals transmitted at discrete timings is used to perform channel estimation and CQI measurement.

FIG. 1A is a format diagram showing an example of a frame structure described in 3GPP R1-051033, Motorola, "Further Topics on Uplink DFT-SOFDM for E-UTRA," Oct. 10-14, 2005. In this example, one frame (sub-frame) has a frame length of 0.5 msec and includes six long blocks LB#1 to LB#6 for transmitting control and data signals and two short blocks SB#1 and SB#2 for transmitting reference signals, with a cyclic prefix (CP) added to each block. That is, the reference signals are time-multiplexed with control and data signals in a frame. The number of short blocks SB to be allocated for reference signals is dependent on the length of a frame. As for the timings of the short blocks SB#1 and SB#2 within a frame, it is sufficient to determine the timings so that the reference signals will function effectively, and the timings shown in the frame structure of FIG. 1A are not limitative.

Moreover, regarding the reference signals, which are allocated the short blocks SB#1 and SB#2, a plurality of orthogonal reference signals can be frequency-multiplexed within a certain frequency band, allowing transmission in a single short block, and these orthogonal reference signals can be allocated to different user equipments respectively. However, the reference-signal bandwidth required by each user equipment is not always the same as that required by another user equipment, and suitable transmission bandwidths differ depending on what purpose a reference signal is used for (such as for modulation/detection of a data signal, for modulation/detection of a L1/L2 control signal, or for CQI measurement).

For example, when a data signal or L1/L2 (physical layer/data link layer) control signal with a transmission bandwidth of 5 MHz is transmitted in a frequency bandwidth of 10 MHz, it is desirable to use a reference signal with the same transmission bandwidth of 5 MHz in order to achieve highly reliable demodulation/detection. However, in the case of a reference signal for CQI measurement, the restriction as to the transmission bandwidth is relaxed because the reference signal is not used for demodulation/detection.

To multiplex as many reference signals as possible while ensuring the orthogonality between the reference signals with different transmission bandwidths as described above, several multiplexing methods have been proposed.

1) Distributed Frequency Division Multiplexing

FIG. 1B is a diagram of a reference-signal structure showing an example of distributed frequency division multiplexing (distributed FDM) of reference signals. Here, it is assumed that a frequency bandwidth of 10 MHz includes four 2.5-MHz frequency blocks, in each of which six subcarriers can be frequency-multiplexed. Moreover, it is assumed that two of the six subcarriers in each frequency block are assigned to each of three transmission bandwidths $\Delta f(a)$, $\Delta f(b)$, and $\Delta f(c)$.

In this example, a set of distributed reference signals corresponding to the transmission bandwidth $\Delta f(a)$ of 10 MHz is allocated to a set of user equipments (UEs) 1a and 2a, in each 2.5-MHz frequency block. Taking the case of the UE 1a as an example, the subcarriers allocated to the UE 1a in the four respective frequency blocks, occupying a four-toothed comb-shaped spectrum, provides one frequency resource. Similarly, two sets of distributed reference signals corresponding to the transmission bandwidth $\Delta f(b)$ of 5 MHz are respectively allocated to two sets of UEs: UEs 1b and 2b, and UEs 3b and 4b. Further, four sets of distributed reference signals corresponding to the transmission bandwidth $\Delta f(c)$ of 2.5 MHz are respectively allocated to four sets of UEs: UEs 1c and 2c, UEs 3c and 4c, UEs 5c and 6c, and UEs 7c and 8c. That is, in distributed FDM, the orthogonality between reference signals with different transmission bandwidths can be ensured because even if reference signals have different transmission bandwidths, the reference signals are distributed across the frequency axis.

However, distributed FDM has a demerit that the number of CAZAC sequences that can be secured decreases as the number of reference signals that are multiplexed in a certain frequency band increases. This is because the maximum number of CAZAC sequences that can be secured is obtained by subtracting one (1) from the sequence length (sequence length-1), and the sequence length of each reference signal decreases as the number of reference signals multiplexed in a certain frequency band increases.

For example, in the case where the total of six distributed reference signals with three types of transmission bandwidths Δf of 10 MHz, 5 MHz, and 2.5 MHz (two signals to each type) are multiplexed in each 2.5-MHz bandwidth (frequency block) as shown in FIG. 1B, a frequency component to be allocated to one distributed reference signal is one sixths of a frequency component allocated in the case of a reference signal occupying a continuous 2.5-MHz frequency block (in the case of localized reference signals). Since the sequence length of a reference signal depends on the number of subcarriers, the sequence length of a reference signal is reduced to ⅙ when a frequency component allocated is ⅙. In proportion to this, the number of CAZAC sequences that can be secured is also reduced. Such a reduction in the number of sequences means that the probability of the same sequence being selected by adjacent cells increases when this scheme in question is applied to a mobile communications system.

2) Hybrid Scheme (CDM+Distributed FDM)

To overcome the above-described restrictions as to the number of CAZAC sequences in distributed FDM, a hybrid scheme of code division multiplexing (CDM) and distributed FDM has been proposed (see 3GPP R1-060319, NTT DoCoMo et al., "Orthogonal Pilot Channel Structure for E-UTRA Uplink," February, 2006). According to this scheme, CDM is used to multiplex reference signals with the same transmission bandwidth, and distributed FDM is used only to multiplex those with different transmission bandwidths. With this scheme, as a whole, the sequence length of each reference signal can be made longer than in the case of using distributed FDM only. Accordingly, the restrictions as to the number of CAZAC sequences can be diminished.

FIG. 1C is a diagram of a reference-signal structure showing an example of the hybrid scheme of CDM and distributed FDM. According to the hybrid scheme, even if the total of six reference signals with three types of transmission bandwidths Δf of 10 MHz, 5 MHz, and 2.5 MHz (two signals to each type) are multiplexed in each 2.5-MHz frequency block as in FIG. 1B, since distributed reference signals with the same transmission bandwidth (here, corresponding to "1a and 2a," "1b and 2b," etc.) are code-multiplexed, the number of frequency components that can be allocated to one distributed reference signal is, at the maximum, twice the number in the case of using distributed FDM only as in FIG. 1B. Accordingly, the sequence length becomes twice, and hence the number of CAZAC sequences that can be secured is also proportionately increased.

However, according to the above-described hybrid scheme, since the sequence length is increased by code-multiplexing reference signals with the same transmission bandwidth, this merit cannot be exploited when reference signals are of many types with different transmission bandwidths. That is, when there are a large number of different types of distributed reference signals with different transmission bandwidths, the sequence length of each reference signal is short, and the restrictions as to the number of sequences that can be secured cannot be satisfactorily diminished.

SUMMARY OF THE INVENTION

An object of the present invention is to provide a novel resource allocation method and reference signal multiplexing method that can diminish the restrictions as to the number of reference signal sequences that can be secured.

According to the present invention, a resource allocating method in a radio communications system performing allocation of a reference resource, includes: a) allocating a first resource to a reference signal which is used at least for either of demodulation and detection, wherein the first resource is at least part of the reference resource; and b) allocating a second resource to an independent reference signal which is used for processing other than demodulation and detection, wherein the second resource is at least part of the reference resource other than allocated to the reference signal which is used at least for either of demodulation and detection.

As described above, according to the present invention, reference signals may be frequency-multiplexed and/or time-multiplexed depending on the usage purpose and importance of the reference signals, whereby a reduction can be achieved in the number of reference signals that are multiplexed by distributed FDM at the same timing in the transmission band of the reference signals. Correspondingly to this reduction, an increase can be achieved in the number of reference signal sequences that can be secured. That is, it is possible to sufficiently diminish the restrictions as to the number of reference signal sequences that can be secured.

BRIEF DESCRIPTION OF THE DRAWINGS

FIG. 1A is a format diagram showing an example of a frame structure described in 3GPP R1-051033, Motorola, "Further Topics on Uplink DFT-SOFDM for E-UTRA," Oct. 10-14, 2005.

FIG. 1B is a diagram of a reference-signal structure showing an example of distributed frequency division multiplexing (distributed FDM) of reference signals.

FIG. 1C is a diagram of a reference-signal structure showing an example of a hybrid scheme of code division multiplexing and distributed FDM.

DETAILED DESCRIPTION OF THE PREFERRED EMBODIMENTS

1. First Exemplary Embodiment 1.1) Resource Allocation

Figure 2:
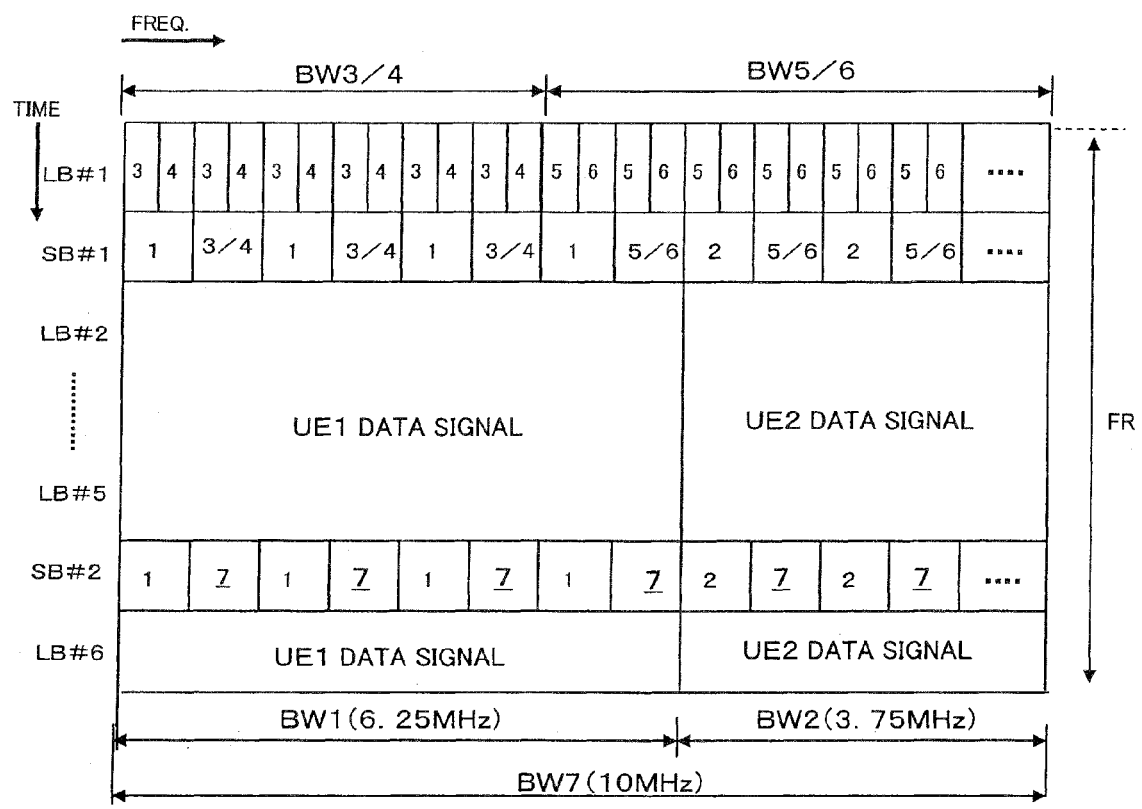
FIG. 2 is a diagram schematically showing an example of a method for multiplexing reference signals, according to a first exemplary embodiment of the present invention.

FIG. 2 is a diagram schematically showing an example of a method for multiplexing reference signals according to a first exemplary embodiment of the present invention. In this example, it is assumed that the frame structure shown in FIG. 1A is used, in which one frame (sub-frame) includes long blocks LB#1 to LB#6, short blocks SB#1 and SB#2, and cyclic prefixes (CP), with the short block SB#1 being inserted between the long blocks LB#1 and LB#2, and the short block SB#2 being inserted between the long blocks LB#5 and LB#6. In addition, it is assumed that L1/L2 control signals are allocated the long block LB#1, that reference signals (also referred to as pilot signals) are allocated the short blocks SB#1 and SB#2, and that data signals are allocated the long blocks LB#2 to LB#6. A time interval between the short blocks SB#1 and SB#2, which reference signals are allocated, is set so that fading variance in each channel during data transmission can be followed. Note that in FIG. 2, illustration of the cyclic prefixes (CP) shown in FIG. 1A is omitted.

Incidentally, the bandwidth of a subcarrier in each short block SB is twice as wide as that in each long block LB. The number of reference signals to be multiplexed by distributed FDM is set so that a sufficient number of reference signal sequences will be provided. It is desirable that the number of reference signals to be multiplexed by distributed FDM be set to two.

Additionally, to simplify the description here, a resource allocated for any one of a L1/L2 control signal, reference signal, and data signal of a certain user equipment will be referred to as a "resource block," and a resource allocated in the frequency domain in one short block will be referred to as a "frequency resource." For example, in FIG. 1B, the set of subcarriers allocated to the UE 1a in four frequency blocks (spectrum in a shape like a four-toothed comb) is a "frequency resource."

Moreover, a L1/L2 control signal, reference signal, and data signal are multiplexed in the time direction in each frame. Resources allocated for these L1/L2 control signal, reference signal, and data signal in one frame FR will be referred to as a control resource, reference resource, and data resource, respectively. Incidentally, a L1/L2 control signal in this example is an uplink control signal regarding a downlink data signal, which is called "data non-associated control signaling," and contains ACK/NACK indicative of whether or not a downlink CQI or a downlink packet has been fully received, and the like.

1.2) Reference Signal for Demodulation/Detection

A reference signal for demodulation/detection (hereinafter, also referred to as a demodulation/detection reference signal) is multiplexed in any one or both of the short blocks SB#1 and SB#2. If a corresponding transmission signal is spread over a sub-frame in time domain and variances in channel quality in time domain cannot be ignored within the period of a sub-frame (for example, like data signals of user equipments UE1 and UE2 in FIG. 2), then the demodulation/detection reference signal is multiplexed in both the short blocks SB#1 and SB#2, across the entire transmission bandwidth of this transmission signal. On the other hand, if a corresponding transmission signal is spread over part of a sub-frame in time domain and variances in channel quality in the time domain can be ignored within the period of part of a sub-frame (for example, like L1/L2 signals of user equipments UE3 to UE6 in FIG. 2), then the demodulation/detection reference signal is multiplexed in only one of the short blocks SB#1 and SB#2. In FIG. 2, the demodulation/detection reference signal is multiplexed in the short block SB#1.

For example, when an uplink L1/L2 control signal or uplink data signal is transmitted, a demodulation/detection reference signal is also transmitted. Therefore, to a user equipment to which a control resource is allocated in a frequency block, a reference resource is also allocated in the same frequency block. To a user equipment to which a data resource is allocated in a frequency block, a reference resource is also allocated in the same frequency block.

Referring to FIG. 2, it is assumed that frequency bandwidths BW1 and BW2 (for example, 6.25 MHz and 3.75 MHz, respectively) for data signals are allocated to mobile stations (user equipments) UE1 and UE2, respectively. In this case, a distributed demodulation/detection reference signal of the mobile station UE1 is multiplexed in both of the short blocks SB#1 and SB#2 within the same frequency bandwidth BW1, and a distributed demodulation/detection reference signal of the mobile station UE2 is allocated both of the short blocks SB#1 and SB#2 within the same frequency bandwidth BW2. Incidentally, in the drawings, the numerals in the short blocks SB#1 and SB#2 represent the mobile stations' numbers (the same holds true with the long block LB#1.)

Moreover, it is assumed that mobile stations UE3 and UE4 are allocated the same frequency bandwidth BW3/4 in the long block LB#1 for L1/L2 control signals, which are multiplexed by distributed FDM within the same bandwidth BW3/4. In this case, corresponding distributed demodulation/detection reference signals of the mobile stations UE3 and UE4 are allocated a short block that is closer to the long block LB#1 (here, the short block SB#1), within the same bandwidth BW3/4.

The L1/L2 control signals of the mobile stations UE3 and UE4 are multiplexed by distributed FDM within a same bandwidth BW3/4, and, if the maximum number of signals that can be multiplexed by CDM in the short block SB#1 is not smaller than two, the distributed reference signals of the mobile stations UE3 and UE4 are multiplexed by CDM in the short block SB#1 (denoted by "3/4" in FIG. 2), within the same frequency bandwidth BW3/4.

Similarly, L1/L2 control signals of mobile stations UE5 and UE6 are multiplexed by distributed FDM within a same bandwidth BW5/6, and, if the maximum number of signals that can be multiplexed by CDM in the short block SB#1 is not smaller than two, corresponding distributed reference signals of the mobile stations UE5 and UE6 are multiplexed by CDM in the short block SB#1 (denoted by "5/6" in FIG. 2), in a distributed manner within the same frequency bandwidth BW5/6.

1.3) Reference Signal for Channel Quality Estimation

A reference signal for channel quality (CQI) estimation (hereinafter, also referred to as a CQI estimation reference signal), which is transmitted independently of a demodulation/detection reference signal, is multiplexed in any one of three types of frequency resources in a short block, which are generalized as follows:

(1) a frequency resource that is never allocated to a demodulation/detection reference signal;

(2) a frequency resource that can be allocated to a demodulation/detection reference signal and has not been currently occupied by (not currently allocated for) a demodulation/detection reference signal; and (3) a frequency resource that can be allocated to a demodulation/detection reference signal and has been currently occupied by (currently allocated for) a demodulation/detection reference signal but satisfies both of the following conditions A and B:

Condition A) the transmission bandwidth of a CQI estimation reference signal is the same as that of the demodulation/detection reference signal; and Condition B) the number of reference signals to be multiplexed by CDM is smaller than the maximum number of multiplexing.

The above-described item (1), "a frequency resource that is not and will not be allocated for a demodulation/detection reference signal," is defined as a frequency resource that is unoccupied in a short block and will be allocated neither for a reference signal for demodulation/detection of a data signal nor for a reference signal for demodulation/detection of a L1/L2 control signal.

For example, in the case where frequency resources in the short blocks SB#1 and SB#2 are allocated to the mobile stations UE1 and UE2 for reference signals for demodulation/detection of their data signals, and to the mobile stations UE3, UE4, UE5, and UE6 for reference signals for demodulation/detection of their L1/L2 control signals as shown in FIG. 2, then an unoccupied resource is a frequency resource with a 10-MHz frequency bandwidth, labeled "7" in FIG. 2. However, this frequency resource with the 10-MHz frequency bandwidth, labeled "7" in FIG. 2, cannot be allocated for another demodulation/detection reference signal, because the two mobile stations UE1 and UE2 are already allocated the short blocks SB#1 and SB#2 for their data signals and the mobile stations UE3 to UE6 are already allocated the short block SB#1 for their L1/L2 control signals.

Accordingly, this unoccupied frequency resource, applying to the above-described item (1), is allocated to a mobile station UE7 for CQI estimation, as shown in FIG. 2. Thereafter, it is checked whether or not there is an unoccupied frequency resource applying to the above-described item (2), and then a frequency resource applying to the above-described item (3). If such a frequency resource is available, the resource is allocated for a CQI estimation reference signal. Hereinafter, specific examples will be shown.

First Example

It is assumed that demodulation/detection reference signals are multiplexed as described above in the section 1.2. In this state, for example, if the mobile station UE7 makes an entry for channel-dependent scheduling with its CQI estimation range set as a bandwidth BW7=10 MHz, then a reference signal for estimation of the channel quality of the mobile station UE7 should be allocated a short block.

In this case, first, it is checked whether or not an unoccupied frequency resource is present in the short block SB#2, which is subsequent to the short block SB#1. This is because the possibility of the presence of an unoccupied frequency resource applying to the above-described item (1), "a frequency resource that is not and will not be allocated for a demodulation/detection reference signal," or an unoccupied frequency resource applying to the above-described item (2), "a frequency resource that can be allocated for a demodulation/detection reference signal and is not currently occupied by a demodulation/detection reference signal," is higher in the short block SB#2 than in the short block SB#1. In the short block SB#2, frequency resources are allocated only to the mobile stations UE1 and UE2 for the reference signals for demodulation/detection of their data signals, and an unoccupied frequency bandwidth is present that is not allocated for at least one of a reference signal for demodulation/detection of a data signal and a reference signal for demodulation/detection of a L1/L2 control signal. Accordingly, if this unoccupied frequency bandwidth is not smaller than the required bandwidth, a CQI estimation reference signal of the mobile station UE7 can be allocated this unoccupied frequency bandwidth. For example, if the unoccupied frequency bandwidth in the short block SB#2 is 10 MHz as shown in FIG. 2, a CQI estimation reference signal of the mobile station UE7 can be allocated the unoccupied frequency bandwidth in the short block SB#2.

Alternatively, it is also possible to check the presence of an unoccupied frequency resource first in the short block SB#1. In this case, the whole short block SB#1 is occupied by the reference signals for demodulation/detection of data and control signals, and none of the transmission bandwidths of these demodulation/detection reference signals match with the bandwidth BW7 (=10 MHz) required by the mobile station UE7. That is, this fact does not meet the above-described condition A, and therefore the short block SB#1 has no room to be allocated for a CQI estimation reference signal of the mobile station UE7.

Second Example

For example, it is assumed that the bandwidth BW7, which is the CQI estimation range for the mobile station UE7, is 6.25 MHz, the same as the frequency bandwidth BW1 for the mobile station UE1. If an unoccupied frequency resource as required is not present in the short block SB#2, then it is checked whether or not an unoccupied frequency resource is present in the short block SB#1. Although the whole short block SB#1 is occupied by the reference signals for demodulation/detection of data and control signals, the transmission bandwidth BW1 of the reference signal for demodulation/detection of the data signal matches with the transmission bandwidth BW7 required by the mobile station UE7, and the maximum number of signals that can be multiplexed by CDM in the short block SB#1 is not smaller than two. This fact meets the above-described condition A. Accordingly, a CQI estimation reference signal of the mobile station UE7 is allocated a frequency resource by being multiplexed by CDM with the demodulation/detection reference signal of the mobile station UE1 in the short block SB#1.

Third Example

For example, it is assumed that bandwidths BW7 and BW8, which are the CQI estimation ranges for two mobile stations UE7 and UE8 respectively, are each 10 MHz. In the short block SB#2, frequency resources are allocated only to the mobile stations UE1 and UE2 for the reference signals for demodulation/detection of their data signals, and an unoccupied frequency bandwidth of 10 MHz is present that is not allocated for at least one of a reference signal for demodulation/detection of a data signal and a reference signal for demodulation/detection of a L1/L2 control signal. Therefore, in this case, if the maximum number of signals that can be multiplexed by CDM in the short block SB#2 is not smaller than two, CQI estimation reference signals of the mobile stations UE7 and UE8 can be allocated this unoccupied frequency bandwidth by CDM.

1.4) Advantages

According to the above-described first exemplary embodiment of the present invention, it is possible to set a small number of reference signals that are multiplexed by distributed FDM in a same short block, within a frequency band in which the reference signals are to be transmitted. For example, if the number of reference signals that are multiplexed by distributed FDM is set to two, then the sequence length of a reference signal is half the length when a reference signal occupies the entire frequency in the same band. Accordingly, it is possible to set a large number of reference signal sequences that can be secured.

In addition, a reference signal for demodulation/detection of a L1/L2 control signal is allocated the short block SB#1, which is closer in the time direction to the long block LB#1 which the L1/L2 control signal is allocated. Therefore, channel estimation used for demodulation of the L1/L2 control signal can be performed with high accuracy.

Further, if an independent reference signal for CQI estimation cannot be allocated the short block SB#1, then the independent reference signal is allocated the short block SB#2, which is closer to the next frame on the time axis. Therefore, the measurement of the channel quality of a mobile station UE in question is less susceptible to a processing delay.

2. Second Exemplary Embodiment

In the above-described first exemplary embodiment, description has been given of the cases where independent reference signals for CQI estimation have the same frequency bandwidths. However, according to the present invention, resources can be allocated even to independent reference signals with different frequency bandwidths.

2.1) Interframe Multiplexing of CQI Estimation Reference Signals

Figure 3:
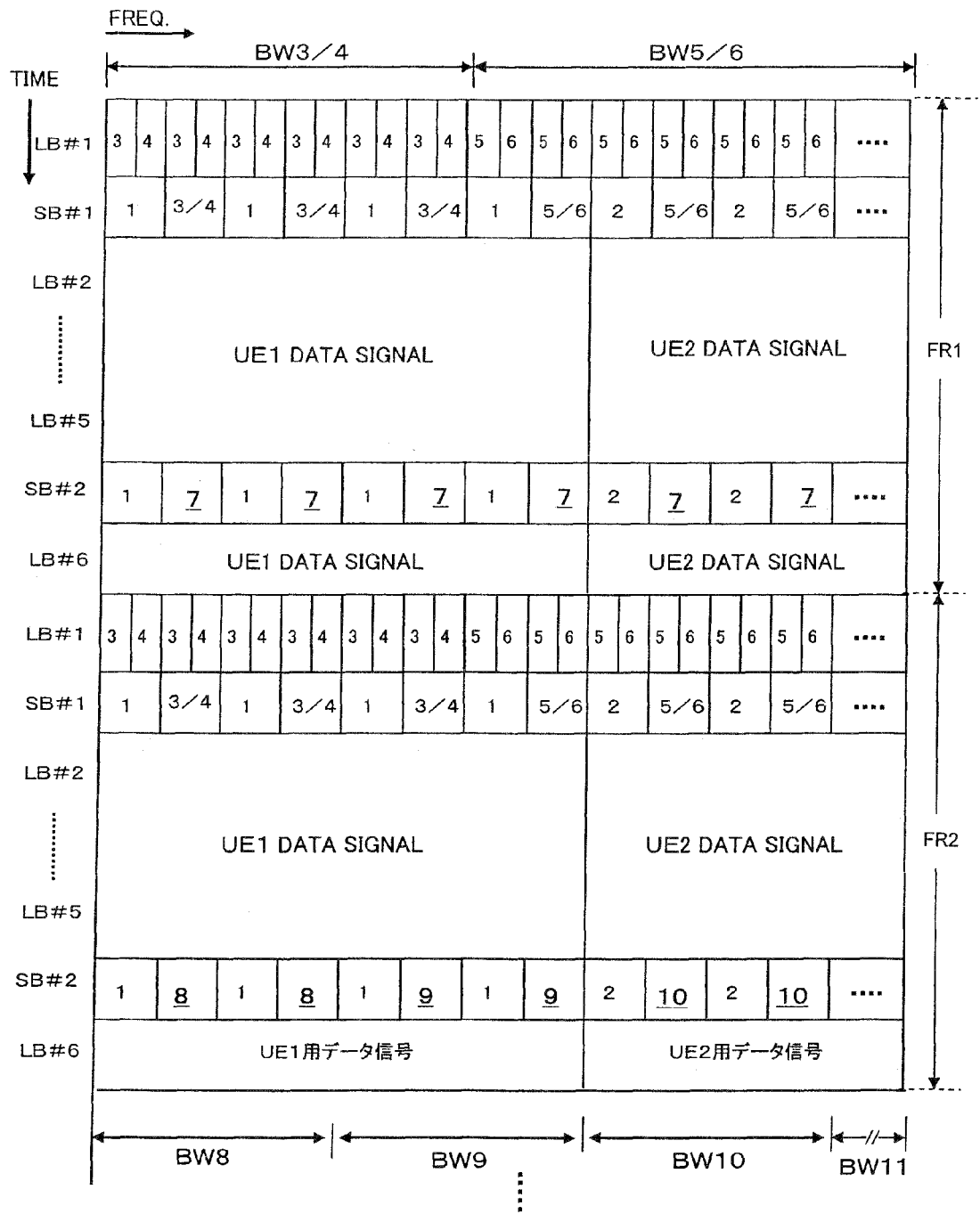
FIG. 3 is a diagram schematically showing an example of a method for multiplexing reference signals, according to a second exemplary embodiment of the present invention.

FIG. 3 is a diagram schematically showing an example of a method for multiplexing reference signals according to a second exemplary embodiment of the present invention. In this example, it is assumed that independent reference signals for CQI estimation have two types of frequency bandwidths. Specifically, it is assumed that the CQI estimation range for a mobile station UE7 is a frequency bandwidth BW7 (=10 MHz, for example) as in the first exemplary embodiment, and that the CQI estimation ranges for mobile stations UE8 to UE11 are equal frequency bandwidths BW8 to BW11 (=2.5 MHz each, for example), respectively.

In this case, resource allocation in a first frame FR1 is the same as in FIG. 2. That is, an independent reference signal of the mobile station UE7 is allocated a short block SB#2 in the frame FR1, as in FIG. 2.

However, as for independent reference signals of the mobile stations UE8 to UE11, the frequency bandwidth thereof (2.5 MHz) matches neither with transmission bandwidths BW1 and BW2 of reference signals for demodulation/detection of data signals of mobile station UE1 and UE2, nor with the transmission bandwidth BW7 of the independent reference signal of the mobile station UE7. Accordingly, since the independent reference signals of the mobile stations UE8 to UE11 do not meet the condition A described earlier, these independent reference signals cannot be allocated either of the short blocks SB#1 and SB#2.

However, channel quality does not need to be consecutively measured for the mobile station UE7, to which the short block SB#2 is allocated in the frame FR1. Accordingly, in this case, it is possible to allocate a short block SB#2 in the next frame FR2, for the independent reference signals of the mobile stations UE8 to UE11. A short block SB#1 in the frame FR2 cannot be allocated because the condition A is not met.

As described above, it is possible to allocate resources even to a plurality of independent reference signals with different transmission bandwidths, by multiplexing the independent reference signals in the time direction.

2.2) CQI Measurement Period

As mentioned above, channel quality (CQI) does not need to be measured in every frame. Nevertheless, as a CQI measurement period becomes shorter, accurate scheduling for mobile stations moving faster can be achieved, although the overhead is increased. Conversely, as a CQI measurement period becomes longer, accurate scheduling for mobile stations moving faster becomes difficult to achieve, but the overhead can be reduced. Therefore, it is desirable to determine the CQI measurement period with consideration given to what moving speed of mobile stations the optimization is based upon.

For example, assuming that a coherent time is a supposed length of time during which channel variance of a mobile station can be considered constant, the effects of channel-dependent scheduling cannot be obtained as expected when the CQI measurement period is longer than the coherent time. Therefore, it is desirable to set the CQI measurement period to be equal to or smaller than the supposed coherent time.

2.3) Advantages

As described above, according to the present embodiment, resources can be allocated even to a plurality of independent reference signals with different transmission bandwidths, by multiplexing the independent reference signals in the time direction.

Accordingly, as in the above-described first exemplary embodiment, it is possible to set a small number of reference signals that are multiplexed by distributed FDM in a same short block, within a frequency band in which the reference signals are to be transmitted. For example, if the number of reference signals that are multiplexed by distributed FDM is set to two, then the sequence length of a reference signal is half the length when a reference signal occupies the entire frequency in the same band. Accordingly, it is possible to set a large number of reference signal sequences that can be secured.

In addition, a reference signal for demodulation/detection of a L1/L2 control signal is allocated the short block SB#1, which is closer in the time direction to the long block LB#1 which the L1/L2 control signal is allocated. Therefore, channel estimation used for demodulation of the L1/L2 control signal can be performed with high accuracy.

Further, if an independent reference signal for CQI estimation cannot be allocated the short block SB#1, then the independent reference signal is allocated the short block SB#2, which is closer to the next frame on the time axis. Therefore, the measurement of the channel quality of a mobile station UE in question is less susceptible to a processing delay.

3. Radio Communications System 3.1) Base Station and Mobile Station

Figure 4:
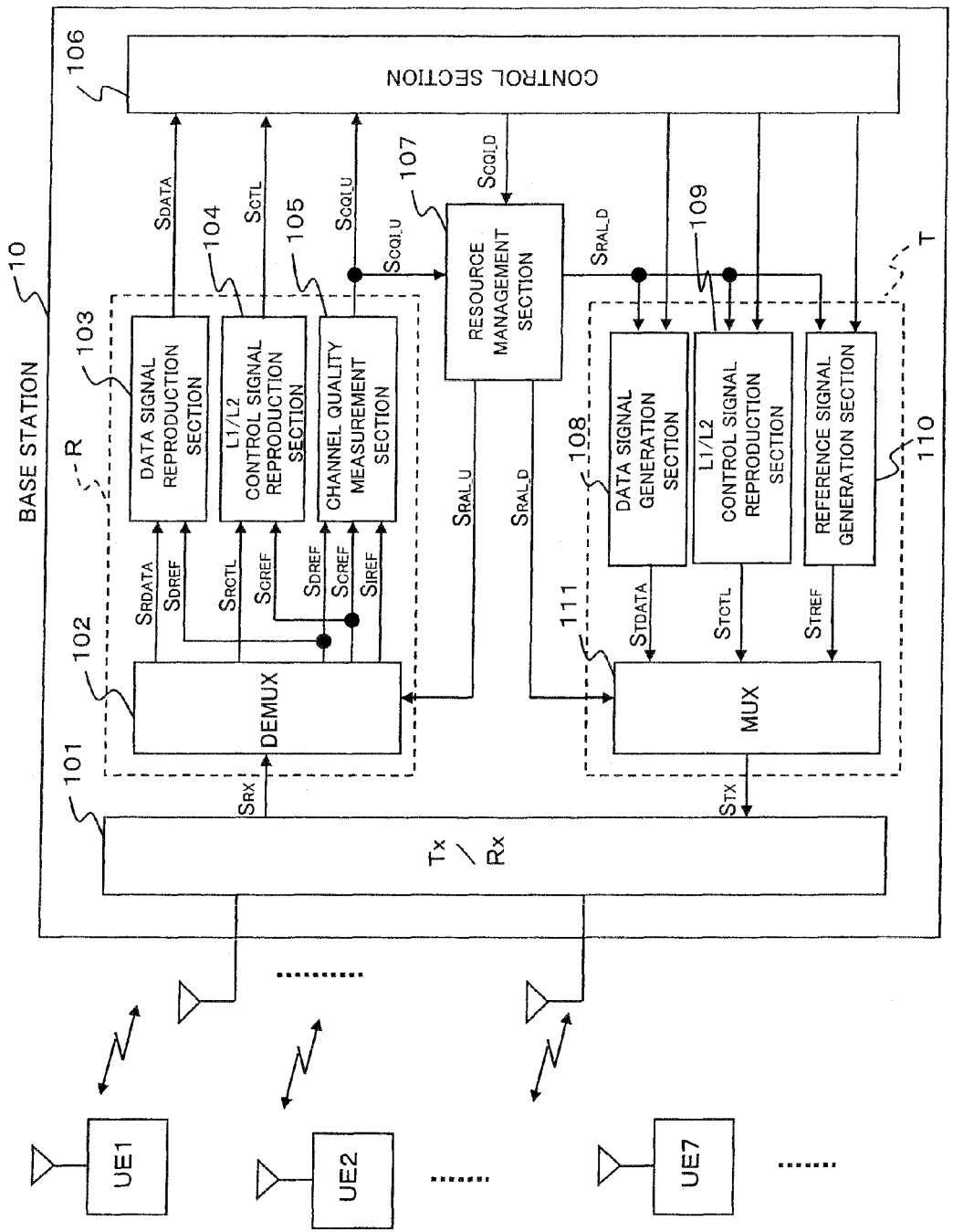
FIG. 4 is a block diagram showing a fundamental configuration of a base station in a radio communications system according to an example of the present invention.

FIG. 4 is a block diagram showing a fundamental configuration of a base station in a radio communications system according to an example of the present invention. Here, it is assumed that a base station 10 accommodates a plurality of mobile stations UE1, UE2, . . . Major components of the base station 10 related to the present example include a radio transceiver (Tx/Rx) 101, a reception processing section R, a control section 106, a resource management section 107, and a transmission processing section T.

The radio transceiver (Tx/Rx) 101 transmits and receives radio signals to/from the plurality of mobile stations UE through respective channels, by using the frequency/time-multiplexing structure as shown in any one of FIGS. 2 and 3. The radio transceiver 101 outputs a multiplexed reception signal $S_{RX}$ from the plurality of mobile stations UE to the reception processing section R, and also converts a multiplexed transmission signal $S_{TX}$ inputted from the transmission processing section T into a radio transmission signal.

The reception processing section R includes a signal demultiplexing section 102, a data signal reproduction section 103, a L1/L2 control signal reproduction section 104, and a channel quality measurement section 105.

The signal demultiplexing section 102 removes cyclic prefixes (CP) and demultiplexes, in time domain, data signals in the long blocks LB#2 to LB#6, L1/L2 control signals in the long block LB#1, and reference signals in the short blocks SB#1 and SB#2, from the reception signal $S_{RX}$ multiplexed by TDM as shown in FIG. 2. Further, in accordance with uplink resource allocation information $S_{RAL\_U}$ from the resource management section 107, the signal demultiplexing section 102 identifies a resource block or resource blocks allocated to each mobile station UE, and demultiplexes the multiplexed reception signal $S_{RX}$ received from the mobile stations UEs back to reception data signals $S_{RDATA}$, reception L1/L2 control signals $S_{RCTL}$, and three types of reference signals: reference signal $S_{DREF}$ for demodulation/detection of the reception data; reference signal $S_{CREF}$ for demodulation/detection of the reception L1/L2 control signal; and independent reference signal $S_{IREF}$ for CQI estimation.

The data signal reproduction section 103 inputs the reception data signal $S_{RDATA}$ and corresponding demodulation/detection reference signal $S_{DREF}$ of each mobile station UE, demodulates/detects reception data $S_{DATA}$, and outputs the reception data $S_{DATA}$ to the control section 106. The L1/L2 control signal reproduction section 104 inputs the reception L1/L2 control signal $S_{RCTL}$ and corresponding demodulation/detection reference signal $S_{CREF}$ of each mobile station UE, demodulates/detects a L1/L2 control signal $S_{CTL}$, and outputs the L1/L2 control signal $S_{CTL}$ to the control section 106.

The channel quality measurement section 105 inputs the three types of reference signals (reference signal $S_{DREF}$ for demodulation/detection of the reception data, reference signal $S_{CREF}$ for demodulation/detection of the reception L1/L2 control signal, and independent reference signal $S_{IREF}$ for CQI estimation), measures uplink channel quality $S_{CQI\_U}$ of each mobile station UE by using a reference signal sequence maintained by itself, and outputs the measured uplink channel quality $S_{CQI\_U}$ to the control section 106 and resource management section 107.

The resource management section 107 inputs the respective uplink channel qualities $S_{CQI\_U}$ of the mobile stations UE and compares them, thereby generating uplink resource allocation information $S_{RAL\_U}$ indicating which resource blocks are allocated to which mobile stations UE, with respect to each of the data signal, L1/L2 control signal, and reference signals. As mentioned above, the signal demultiplexing section 102 performs signal demultiplexing in accordance with this uplink resource allocation information $S_{RAL\_U}$.

The transmission processing section T includes a data signal generation section 108, a L1/L2 control signal generation section 109, a reference signal generation section 110, and a signal multiplexing section 111.

The data signal generation section 108 generates a downlink data signal $S_{TDATA}$ for a mobile station UE to which downlink data should be transmitted, in accordance with downlink resource allocation information $S_{RAL\_D}$ inputted from the resource management section 107, and outputs the generated downlink data signal $S_{TDATA}$ to the signal multiplexing section 111. The L1/L2 control signal generation section 109 generates a downlink L1/L2 control signal $S_{TCTL}$ for a mobile station UE to which a downlink L1/L2 control signal should be transmitted, in accordance with the downlink resource allocation information $S_{RAL\_D}$ inputted from the resource management section 107, and outputs the generated downlink L1/L2 control signal $S_{TCTL}$ to the signal multiplexing section 111. The reference signal generation section 110 generates a reference signal $S_{TREF}$ in accordance with the downlink resource allocation information $S_{RAL\_D}$ received as input from the resource management section 107 and outputs the generated reference signal $S_{TREF}$ to the signal multiplexing section 111. As described above, in accordance with the downlink resource allocation information $S_{RAL\_D}$, the reference signal generation section 110 generates a demodulation/detection reference signal for a mobile station UE to which a downlink data signal or downlink L1/L2 control signal is to be transmitted, and generates a CQI estimation reference signal for a mobile station UE which has made an entry for channel-dependent scheduling. The resource management section 107 inputs downlink channel qualities $S_{CQI\_D}$ respectively measured by the mobile stations UE and then generates the downlink resource allocation information $S_{RAL\_D}$, which will be described later.

The signal multiplexing section 111 multiplexes in FDM and/or TDM the thus generated downlink data signals $S_{TDATA}$, downlink L1/L2 control signals $S_{TCTL}$, and reference signals $S_{TREF}$ for the mobile stations UE, in accordance with the downlink resource allocation information $S_{RAL\_D}$, thereby generating a transmission signal $S_{TX}$ and transmitting it from the radio transceiver 101.

Incidentally, the uplink resource allocation information $S_{RAL\_U}$ and downlink resource allocation information $S_{RAL\_D}$ generated by the resource management section 107 are contained in a L1/L2 control signal generated by the L1/L2 control signal generation section 109 and are transmitted to each mobile station UE, under the control of the control section 106. Each mobile station UE receives these uplink resource allocation information $S_{RAL\_U}$ and downlink resource allocation information $S_{RAL\_D}$ and determines resource blocks to use respectively for uplink and downlink communications with the base station 10 in accordance with the received uplink resource allocation information $S_{RAL\_U}$ and downlink resource allocation information $S_{RAL\_D}$.

Moreover, the control section 106 controls the entire operation of the base station 10. The functions of the resource management section 107 can also be implemented by executing a resource management program on a program-controlled processor, or a computer.

Figure 5:
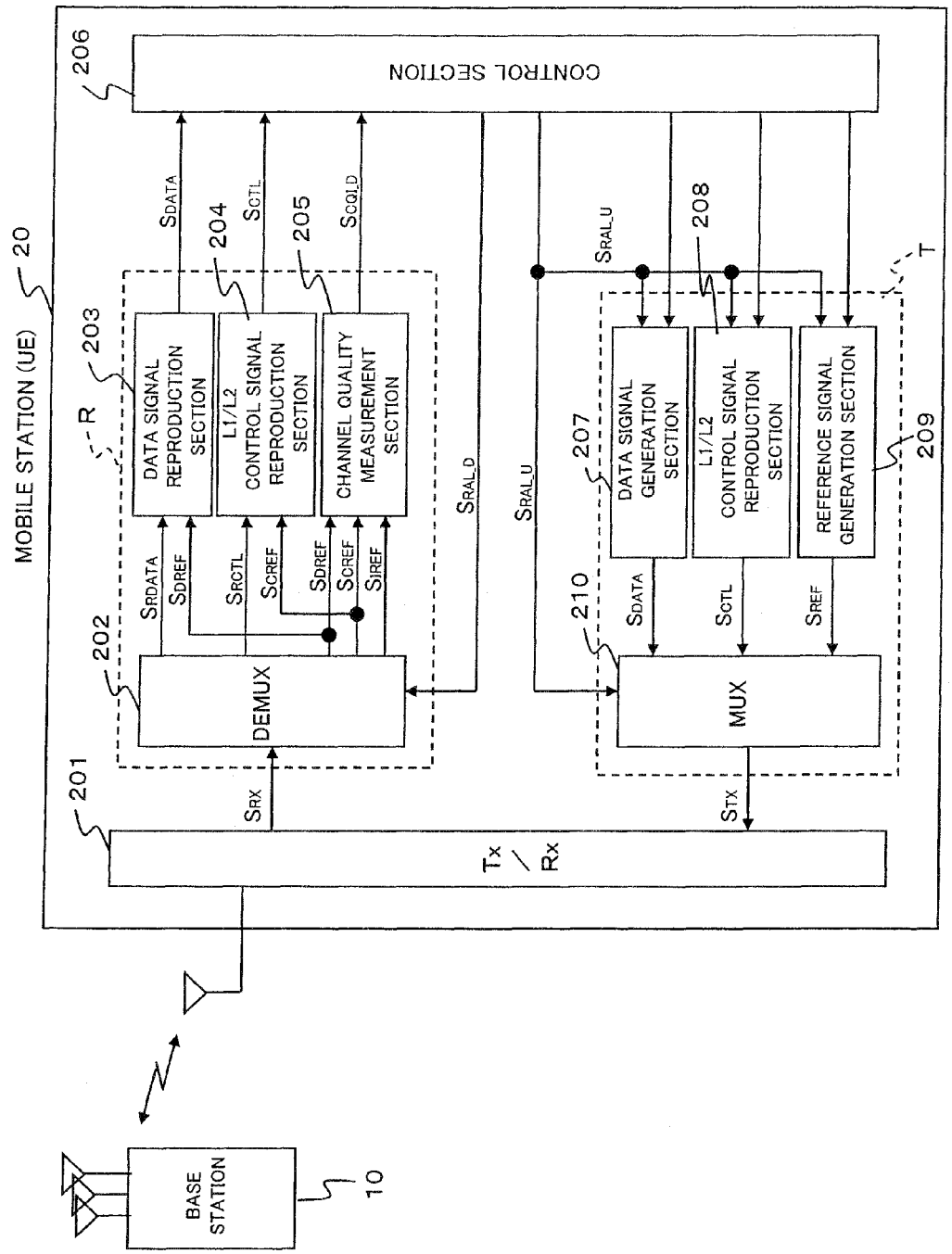
FIG. 5 is a block diagram showing a fundamental configuration of a mobile station in the radio communications system according to this example.

FIG. 5 is a block diagram showing a configuration of a mobile station in the radio communications system according to the present example. Since mobile stations do not perform resource management, resources for the mobile station itself to use in transmission and reception are determined in accordance with the uplink resource allocation information $S_{RAL\_U}$ and downlink resource allocation information $S_{RAL\_D}$ received from the base station 10. Hereinafter, the configuration of a mobile station will be described briefly.

Referring to FIG. 5, major components of a mobile station 20 related to the present example include a radio transceiver (Tx/Rx) 201, a reception processing section R, a control section 206, and a transmission processing section T. The radio transceiver 201 transmits and receives radio signals to/from the base station 10 through a designated channel. The reception processing section R includes a signal demultiplexing section 202, a data signal reproduction section 203, a L1/L2 control signal reproduction section 204, and a channel quality measurement section 205.

The signal demultiplexing section 202 identifies a resource block or resource blocks allocated to the mobile station 20, in accordance with downlink resource allocation information $S_{RAL\_D}$ designated by the control section 206, and demultiplexes a reception data signal $S_{RDATA}$, a reception L1/L2 control signal $S_{RCTL}$, and three types of reference signals: reference signal $S_{DREF}$ for demodulation/detection of the reception data; reference signal $S_{CREF}$ for demodulation/detection of the reception L1/L2 control signal; and independent reference signal $S_{IREF}$ for CQI estimation.

The data signal reproduction section 203 inputs the reception data signal $S_{RDATA}$ and corresponding demodulation/detection reference signal $S_{DREF}$, demodulates/detects reception data $S_{DATA}$, and outputs the reception data $S_{DATA}$ to the control section 206. The L1/L2 control signal reproduction section 204 inputs the reception L1/L2 control signal $S_{RCTL}$ and corresponding demodulation/detection reference signal $S_{CREF}$, demodulates/detects a L1/L2 control signal $S_{CTL}$, and outputs the L1/L2 control signal $S_{CTL}$ to the control section 206. The channel quality measurement section 205 inputs the three types of reference signals (reference signal $S_{DREF}$ for demodulation/detection of the reception data, reference signal $S_{CREF}$ for demodulation/detection of the reception L1/L2 control signal, and independent reference signal $S_{IREF}$ for CQI estimation), measures downlink channel quality $S_{CQI\_D}$ of the mobile station 20 itself, and outputs the measured downlink channel quality $S_{CQI\_D}$ to the control section 206.

When a L1/L2 control signal $S_{CTL}$ received from the base station 10 contains uplink resource allocation information $S_{RAL\_U}$ and downlink resource allocation information $S_{RAL\_D}$, the control section 206 controls the signal demultiplexing section 202 in accordance with the downlink resource allocation information $S_{RAL\_D}$ as described above, and controls the transmission processing section T in accordance with the uplink resource allocation information $S_{RAL\_U}$ as described below.

The transmission processing section T includes a data signal generation section 207, a L1/L2 control signal generation section 208, a reference signal generation section 209, and a signal multiplexing section 210.

The data signal generation section 207, when transmitting uplink data, generates an uplink data signal $S_{TDATA}$ in accordance with the uplink resource allocation information $S_{RAL\_U}$ inputted from the control section 206 and outputs the generated uplink data signal $S_{TDATA}$ to the signal multiplexing section 210. The L1/L2 control signal generation section 208, when transmitting an uplink L1/L2 control signal, generates an uplink L1/L2 control signal $S_{TCTL}$ in accordance with the uplink resource allocation information $S_{RAL\_U}$ and outputs the generated uplink L1/L2 control signal $S_{TCTL}$ to the signal multiplexing section 210. The reference signal generation section 209 generates a reference signal $S_{TREF}$ in accordance with the uplink resource allocation information $S_{RAL\_U}$ and outputs the generated reference signal $S_{TREF}$ to the signal multiplexing section 210. As described above, in accordance with the uplink resource allocation information $S_{RAL\_U}$, the reference signal generation section 209 generates a demodulation/detection reference signal when the mobile station 20 has an uplink data signal or uplink L1/L2 control signal to transmit, and generates a CQI estimation reference signal when the mobile station 20 has made an entry for channel-dependent scheduling.

The signal multiplexing section 210 multiplexes the thus generated uplink data signal $S_{TDATA}$, uplink L1/L2 control signal $S_{TCTL}$, and/or reference signal $S_{TREF}$ in the resource blocks designated by the uplink resource allocation information $S_{RAL\_U}$, thereby generating a transmission signal $S_{TX}$ and transmitting it from the radio transceiver 201 to the base station 10.

3.2) Operation

Figure 6:
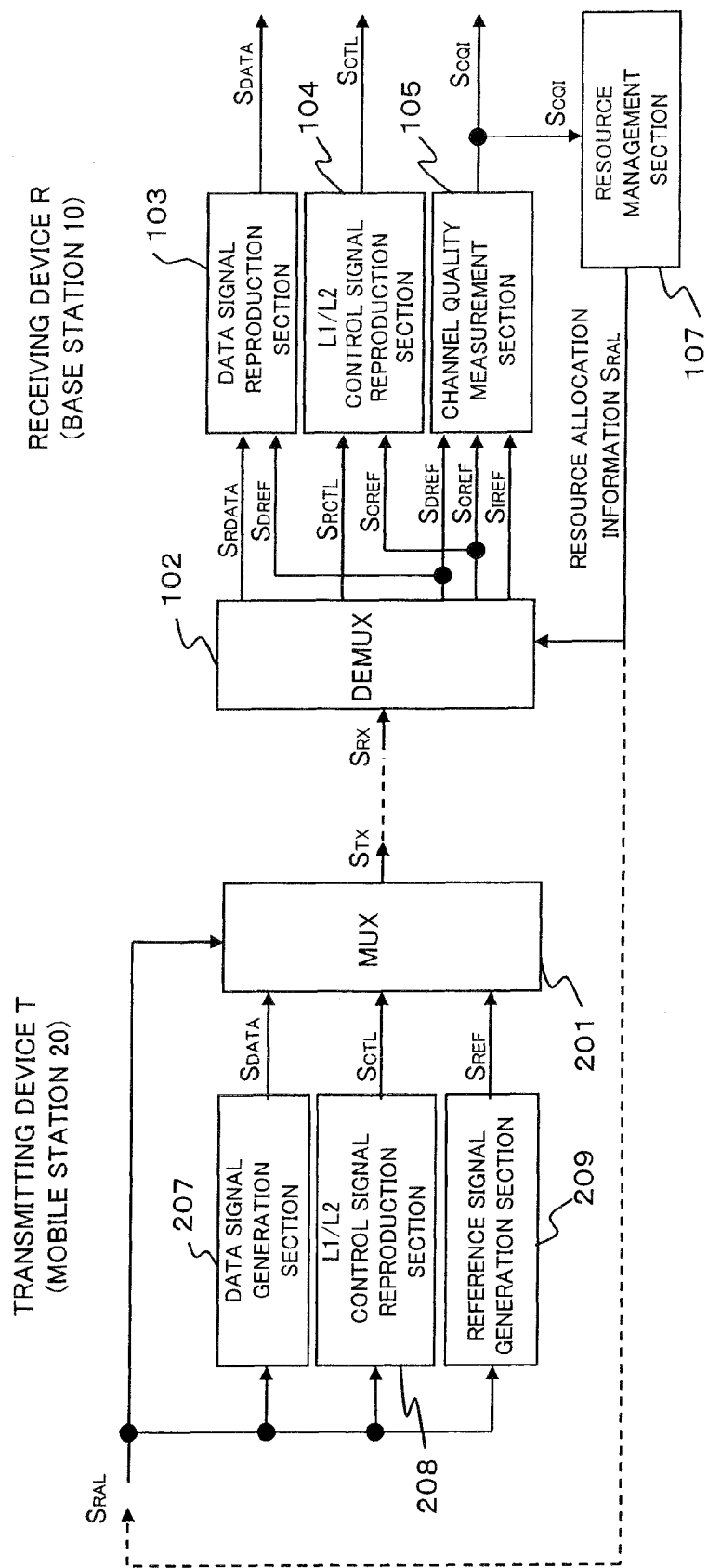
FIG. 6 is a schematic diagram of a system architecture for describing operations in the radio communications system according to this example.

FIG. 6 is a schematic diagram showing system architecture for describing operations in the radio communications system according to the present example. Here a transmitting device T corresponds to the mobile station 20 shown in FIG. 5, and a receiving device R corresponds to the base station 10 shown in FIG. 4. Blocks having the same functions as those in FIGS. 4 and 5 are denoted by the same reference numerals as those in FIGS. 4 and 5, and the description thereof will be omitted. Hereinafter, operations of the transmitting device T and receiving device R will be described with reference to the block diagram of FIG. 6 and flowcharts of FIGS. 7 and 8. Note that in FIG. 6, a signal is transmitted from the transmitting device T to the receiving device R, and therefore uplink resource allocation information $S_{RAL\_U}$ and downlink resource allocation information $S_{RAL\_D}$ are simply referred to as "resource allocation information $S_{RAL}$."

Figure 7:
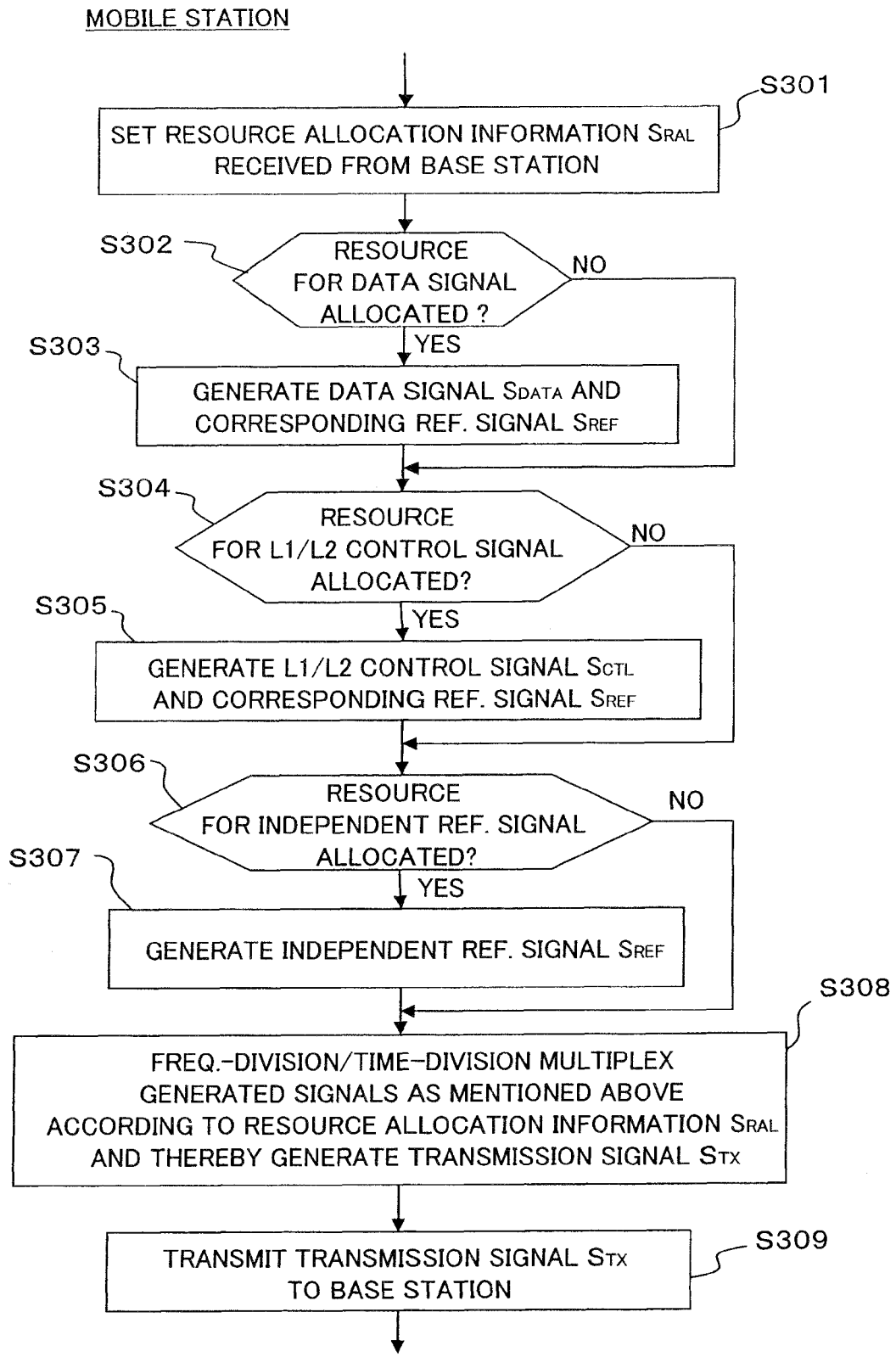
FIG. 7 is a flowchart showing an operation of the mobile station in this example.

FIG. 7 is a flowchart showing an operation of the mobile station according to the present example. First, the control section 206 of the mobile station sets resource allocation information $S_{RAL}$ received from the base station 10 (step S301), and then determines whether or not a resource for a data signal is allocated (step S302). If a resource for a data signal is allocated (YES in step S302), the control section 206 controls the data signal generation section 207 and reference signal generation section 209 to generate a data signal $S_{DATA}$ and a reference signal $S_{REF}$ (step S303) If a resource for a data signal is not allocated (NO in step S302), the control section 206 does not carry out the step S303.

Subsequently, the control section 206 determines whether or not a resource for a L1/L2 control signal is allocated (step S304). If a resource for a L1/L2 control signal is allocated (YES in step S304), the control section 206 controls the L1/L2 control signal generation section 208 and reference signal generation section 209 to generate a L1/L2 control signal $S_{CTL}$ and a reference signal $S_{REF}$ (step S305). If a resource for a L1/L2 control signal is not allocated (NO in step S304), the control section 206 does not carry out the step S305.

Subsequently, the control section 206 determines whether or not a resource for a CQI estimation reference signal (independent reference signal) is allocated (step S306). If a resource for an independent reference signal is allocated (YES in step S306), the control section 206 controls the reference signal generation section 209 to generate an independent reference signal $S_{REF}$ (step S307). If a resource for an independent reference signal is not allocated (NO in step S306), the control section 206 does not carry out the step S307.

The signals thus generated by the data signal generation section 207, L1/L2 control signal generation section 208, and/or reference signal generation section 209 are multiplexed by FDM and/or TDM in accordance with the resource allocation information $S_{RAL}$ as described already, whereby a transmission signal $S_{TX}$ is generated (step S308). The transmission signal $S_{TX}$ is transmitted to the base station 10 via the radio transceiver 201 (step S309).

Figure 8:
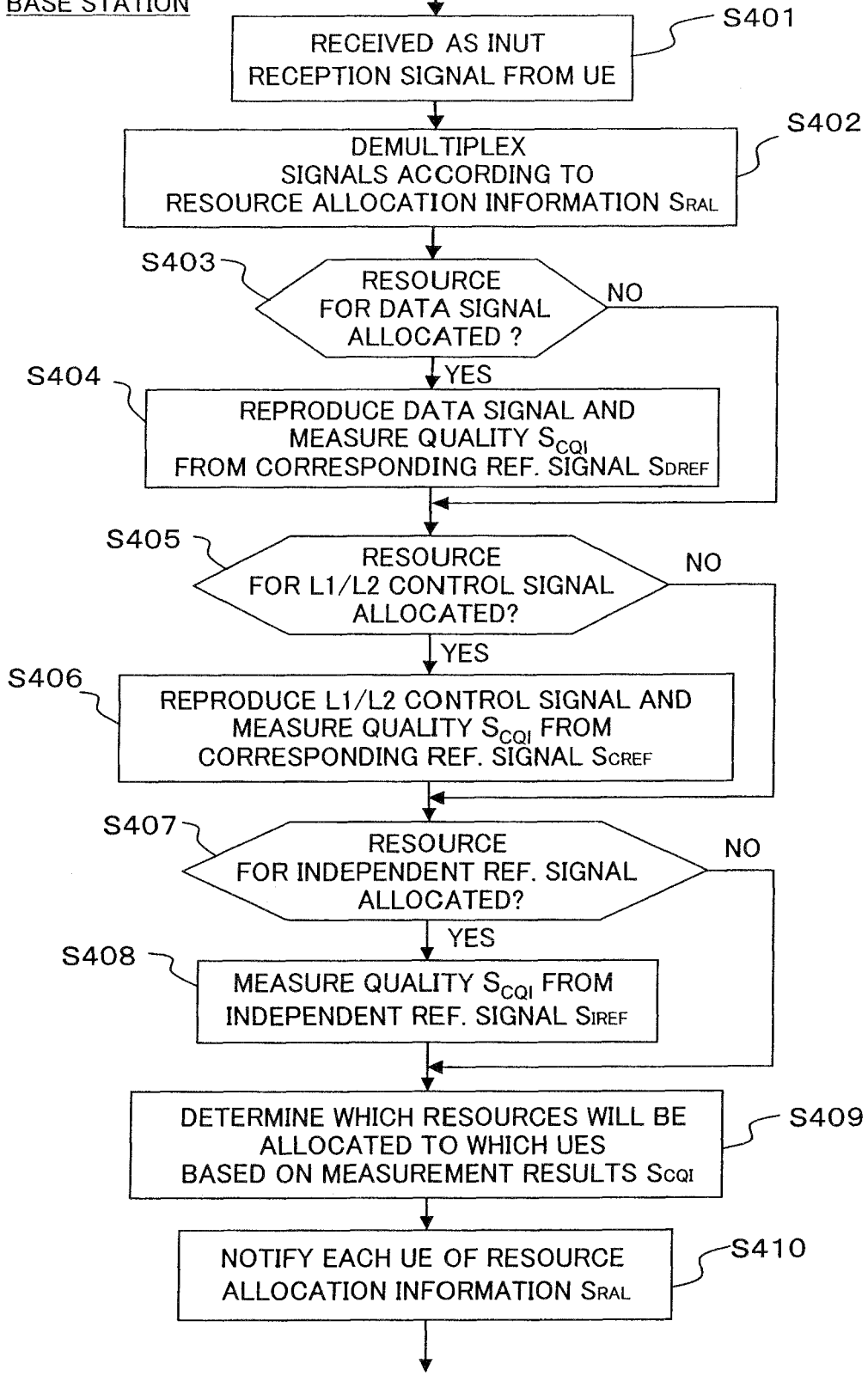
FIG. 8 is a flowchart showing an operation of the base station in this example.

FIG. 8 is a flowchart showing an operation of the base station according to the present example. First, when the base station 10 receives a multiplexed signal from a plurality of mobile stations UE (step S401), the control section 106 of the base station 10 controls the signal demultiplexing section 102, using resource allocation information $S_{RAL}$. Thereby, the signal demultiplexing section 102 identifies a resource block or resource blocks allocated to each mobile station UE and demultiplexes a reception data signal $S_{RDATA}$, a reception L1/L2 control signal $S_{RCTL}$, and three types of reference signals (reference signal $S_{DREF}$ for demodulation/detection of the reception data, reference signal $S_{CREF}$ for demodulation/detection of the reception L1/L2 control signal, and independent reference signal $S_{IREF}$ for CQI estimation) of each mobile station UE (step S402).

Subsequently, the control section 106 controls the resource management section 107, which then determines, with respect to each mobile station UE, whether or not a resource for a data signal is allocated (step S403). If a resource for a data signal is allocated to the mobile station UE (YES in step S403), the control section 106 controls the data signal reproduction section 103 to have it reproduce an uplink data signal $S_{DATA}$ sent from the mobile station UE in question, and controls the channel quality measurement section 105 to have it measure channel quality $S_{CQI}$ of the mobile station UE in question from the reference signal $S_{DREF}$ for demodulation/detection of that reception data (step S404) For a mobile station UE to which a resource for a data signal is not allocated (NO in step S403), the control section 106 does not carry out the step S404.

Subsequently, the control section 106 controls the resource management section 107, which then determines, with respect to each mobile station UE, whether or not a resource for a L1/L2 control signal is allocated (step S405). If a resource for a L1/L2 control signal is allocated to the mobile station UE (YES in step S405), the control section 106 controls the L1/L2 control signal reproduction section 104 to have it reproduce an uplink L1/L2 control signal $S_{CTL}$ sent from the mobile station UE in question, and controls the channel quality measurement section 105 to have it measure channel quality $S_{CQI}$ of the mobile station UE in question from a reference signal $S_{CREF}$ for demodulation/detection of that L1/L2 control signal (step S406). For a mobile station UE to which a resource for a L1/L2 control signal is not allocated (NO in step S403), the control section 106 does not carry out the step S406.

Subsequently, the control section 106 determines whether or not a resource for a CQI estimation reference signal (independent reference signal) is allocated (step S407). If a resource for an independent reference signal is allocated (YES in step S407), the control section 106 controls the channel quality measurement section 105 to have it measure channel quality $S_{CQI}$ of the mobile station UE in question from the independent reference signal $S_{IREF}$ (step S408). For a mobile station UE to which a resource for an independent reference signal is not allocated (NO in step S407), the control section 106 does not carry out the step S408.

Subsequently, the control section 106 controls the resource management section 107 to determine which resources will be allocated to which mobile stations UE (that is, resource allocation information $S_{RAL}$), based on the channel quality $S_{CQI}$ of each mobile station UE inputted from the channel quality measurement section 105 (step S409). Then, as described already, corresponding resource allocation information $S_{RAL}$ is notified to each mobile station UE (step S410).

3.3) Resource Allocation

Hereinafter, an operation of the base station to allocate a resource for a reference signal will be described by using the resource allocation shown in FIG. 2 as an example.

Figure 9A:
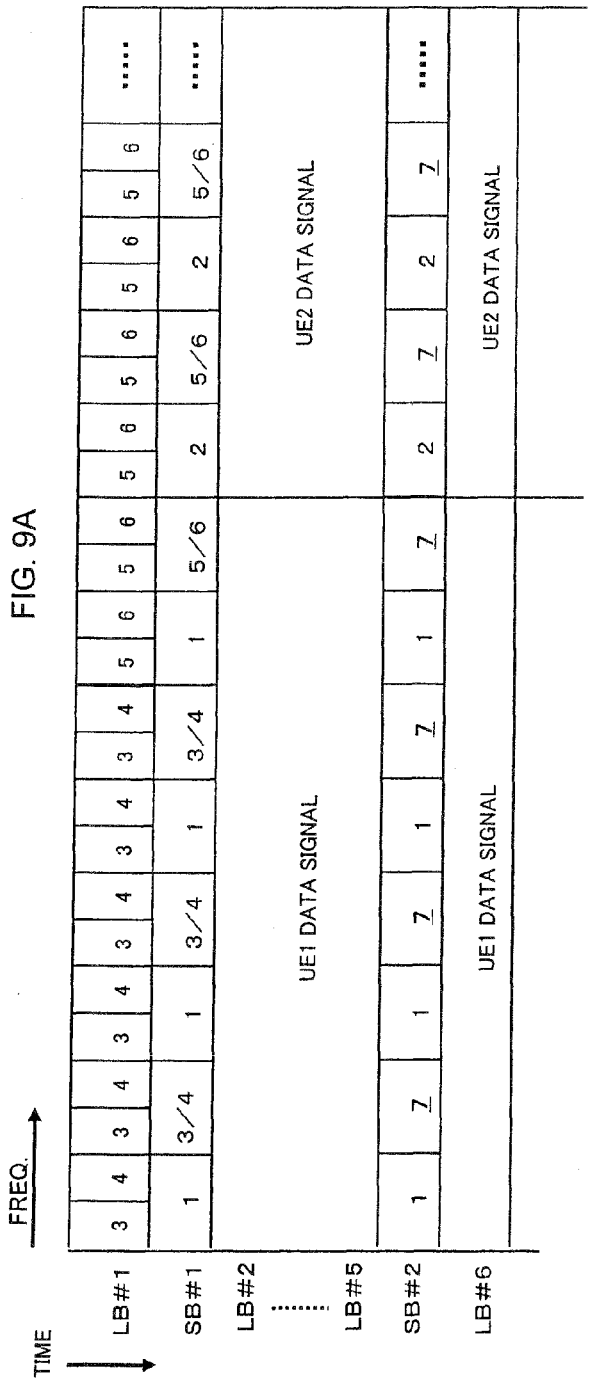
FIG. 9A is a diagram of a frame structure showing the resource allocation in FIG. 2.
Figure 9D:
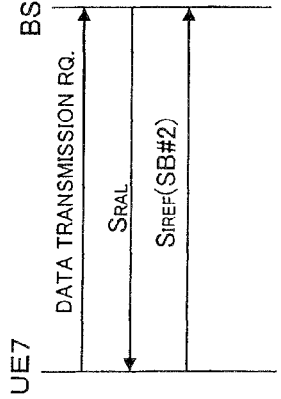
FIG. 9D is a sequence diagram showing an allocation of a resource for a reference signal to a mobile station transmitting an independent reference signal.
Figure 9C:
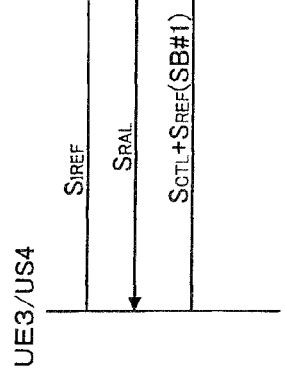
FIG. 9C is a sequence diagram showing an allocation of a resource for a reference signal to a mobile station transmitting a L1/L2 control signal.
Figure 9B:
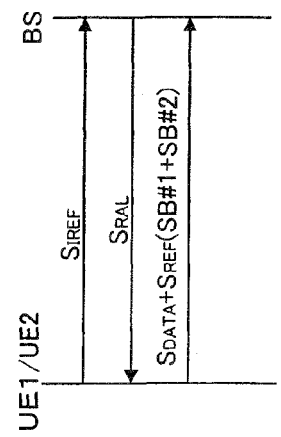
FIG. 9B is a sequence diagram showing an allocation of a resource for a reference signal to a mobile station transmitting data.

FIG. 9A is a diagram of a frame structure showing the resource allocation shown in FIG. 2. FIG. 9B is a sequence diagram showing allocation of a resource for a reference signal to a mobile station transmitting data. FIG. 9C is a sequence diagram showing allocation of a resource for a reference signal to a mobile station transmitting a L1/L2 control signal. FIG. 9D is a sequence diagram showing allocation of a resource for a reference signal to a mobile station transmitting an independent reference signal.

Referring to FIG. 9B, it is assumed that, for example, a mobile station UE1 has transmitted a CQI estimation reference signal $S_{IREF}$ using an unoccupied frequency resource in a short block SB#1 or SB#2 in accordance with resource allocation information $S_{RAL}$ received from the base station 10, as described in any one of the first to third examples in the section 1.3. The base station 10 measures channel quality $S_{CQI}$ of the mobile station UE1 from this CQI estimation reference signal $S_{IREF}$. When the base station 10 determines to allocate a resource for a data signal to the mobile station UE1 as shown in FIG. 9A, the base station 10 notifies the mobile station UE1 of resource allocation information $S_{RAL}$ indicative of a transmission frequency bandwidth to be allocated and corresponding frequency resources in short blocks SB#1 and SB#2. In accordance with this resource allocation information $S_{RAL}$, the mobile station UE1 generates uplink data $S_{DATA}$ and a corresponding demodulation/detection reference signal $S_{REF}$, multiplexes in distributed-FDM and TDM manner the demodulation/detection reference signal $S_{REF}$ in each of the short blocks SB#1 and SB#2 as shown in FIG. 9A, and then transmits the multiplexed signal to the base station 10.

Referring to FIG. 9C, it is assumed that, for example, a mobile station UE3 has transmitted a CQI estimation reference signal $S_{IREF}$ by using an unoccupied frequency resource in a short block SB#1 or SB#2 in accordance with resource allocation information $S_{RAL}$ received from the base station 10, as described in any one of the first to third examples in the section 1.3. The base station 10 measures channel quality $S_{CQI}$ of the mobile station UE3 from this CQI estimation reference signal $S_{IREF}$. When the base station 10 determines to allocate a resource for a L1/L2 control signal to the mobile station UE3 as shown in FIG. 9A, the base station 10 notifies the mobile station UE3 of resource allocation information SR L indicative of a transmission frequency bandwidth to be allocated and a corresponding frequency resource in a short block SB#1. In accordance with this resource allocation information $S_{RAL}$, the mobile station UE3 generates an uplink L1/L2 control signal $S_{CTL}$ and a corresponding demodulation/detection reference signal $S_{REF}$, multiplexes in distributed-FDM and TDM manner the demodulation/detection reference signal $S_{REF}$ in the short block SB#1 as shown in FIG. 9A, and then transmits the multiplexed signal to the base station 10.

Referring to FIG. 9D, it is assumed that a mobile station UE7 has sent a request for data transmission to the base station 10 and has made an entry for channel-dependent scheduling with the resource management section 107 of the base station 10. In this case, the mobile station UE7 transmits a CQI estimation reference signal $S_{IREF}$ by using an unoccupied frequency resource in a short block SB#1 or SB#2 in accordance with resource allocation information $S_{RAL}$ received from the base station 10, as described in any one of the first to third examples in the section 1.3. Specifically, here, the base station 10 notifies the mobile station UE7 of resource allocation information $S_{RAL}$ indicative of the entire frequency bandwidth of a short block SB#2 as shown in FIG. 9A. In accordance with this resource allocation information $S_{RAL}$, the mobile station UE7 generates a CQI estimation reference signal $S_{IREF}$, distributed—frequency-division-multiplexes and time-division-multiplexes the CQI estimation reference signal $S_{IREF}$ in the short block SB#2, and then transmits the multiplex signal to the base station 10.

3.4) Resource Allocation to CQI Estimation Reference Signal

Next, a procedure of allocating a resource to a CQI estimation reference signal according to the present example will be described. Note, however, that the under-mentioned order of steps should be regarded as illustrative only and not restrictive.

Figure 10:
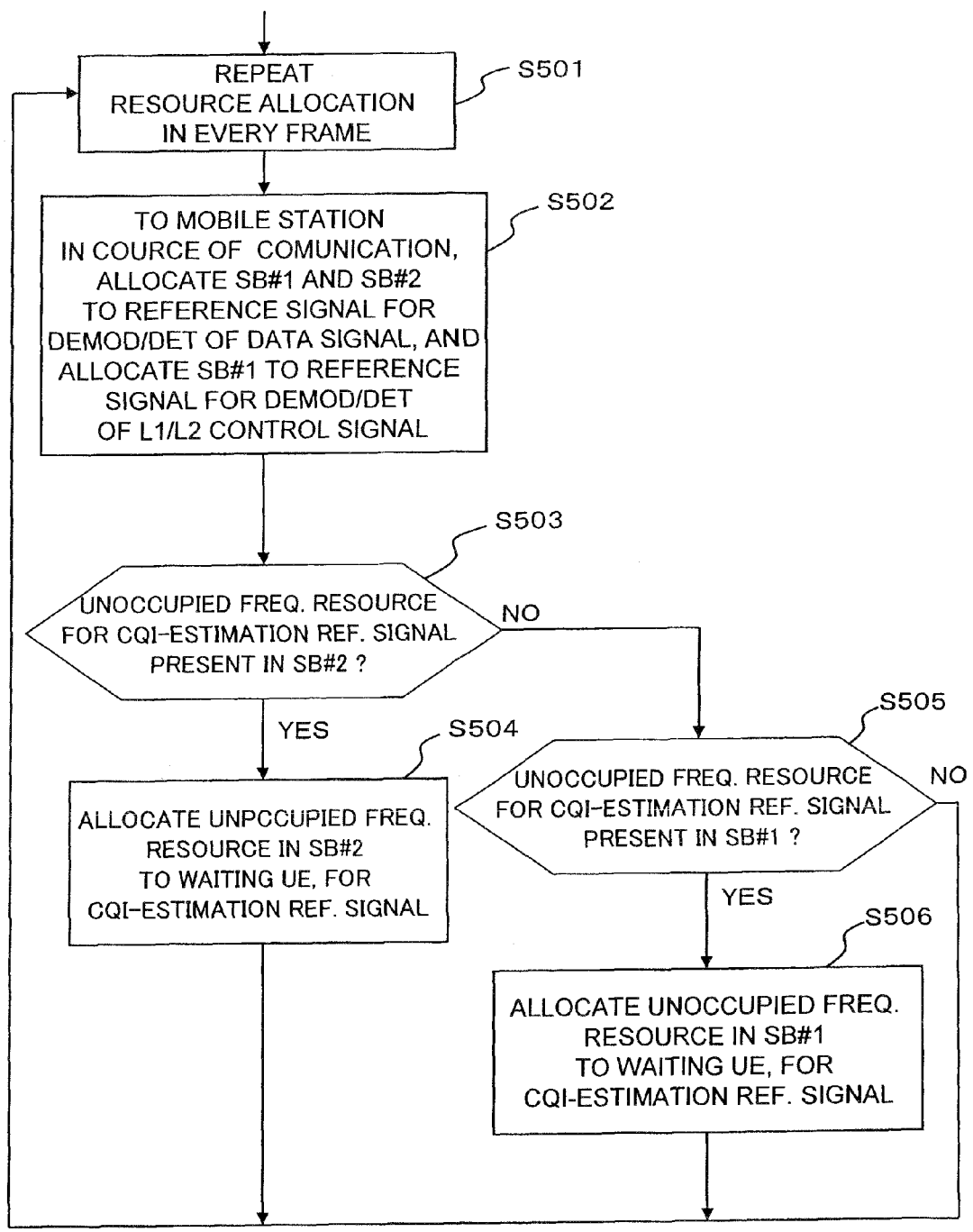
FIG. 10 is a flowchart showing resource allocation control to allocate a resource for a CQI estimation reference signal, according to this example.

FIG. 10 is a flowchart showing resource allocation control to allocate a resource to a CQI estimation reference signal according to the present example. In the present example, the operation of allocating resources for demodulation/detection and CQI estimation reference signals in the short blocks SB#1 and SB#2 is repeated in every frame (S501).

In one frame, if a mobile station in course of communication exists, a frequency resource with a transmission bandwidth required for a reference signal used in that communication is allocated to this mobile station (S502). Specifically, to a mobile station (UE) that is communicating data, a frequency resource in both the short blocks SB#1 and SB#2 is allocated to a reference signal for demodulation/detection of the data, and to a mobile station that is communicating a L1/L2 control signal, a frequency resource in the short block SB#1 is allocated to a reference signal for demodulation/detection of the L1/L2 control signal.

Subsequently, it is checked whether or not an unoccupied frequency resource is present in the short block SB#2 (step S503). The checking of the presence or absence of an unoccupied frequency resource can be carried out as described already in the section 1.3. For example, the steps are as follows:

(1) It is checked whether or not a frequency resource is never allocated to a demodulation/detection reference signal;

(2) When an unoccupied frequency resource applying to the above item (1) is not present, it is checked whether or not a frequency resource is present which can be allocated to a demodulation/detection reference signal but has not been currently occupied by (not currently allocated to) a demodulation/detection reference signal; and (3) When an unoccupied frequency resource applying to the above item (2) is not present, it is checked whether or not a frequency resource is present which can be allocated to a demodulation/detection reference signal and has been currently occupied by (currently allocated to) a demodulation/detection reference signal but satisfies both of the following conditions A and B:

Condition A) the transmission bandwidth of a CQI estimation reference signal is the same as that of the demodulation/detection reference signal; and Condition B) the number of reference signals to be multiplexed by CDM is smaller than the maximum number of multiplexing.

If such a frequency resource is present in the short block SB#2 (YES in step S503), then this frequency resource in the short block SB#2 is allocated to, depending on the bandwidth of the frequency resource, one or a plurality of the mobile stations waiting for channel-dependent scheduling, for their CQI estimation reference signals (step S504).

If such a frequency resource is not present in the short block SB#2 (NO in step S503), it is next checked whether or not an unoccupied frequency resource is present in the short block SB#1 (step S505). The checking of the presence or absence of an unoccupied frequency resource is similarly performed as in the above-described procedure.

If such a frequency resource is present in the short block SB#1 (YES in step S505), then this frequency resource in the short block SB#1 is allocated to, depending on the bandwidth of the frequency resource, one or a plurality of the mobile stations waiting for channel-dependent scheduling, for their CQI estimation reference signals (step S506). If such a frequency resource is not present in the short block SB#1 either (NO in step S505), similar processing is repeated in the next frame.

Note that after an unoccupied frequency resource in the short block SB#2 is allocated to a CQI measurement reference signal (step S504), the step S505 may also be subsequently performed, in which it is checked whether or not an unoccupied frequency resource is present in the short block SB#1.

3.5) Advantages

As described hereinabove, by applying the present invention to mobile stations and base stations in a radio communications system, it is possible to set a sufficiently small number of reference signals that are multiplexed by distributed FDM in a same short block, within a frequency band where the reference signals are to be transmitted. Accordingly, it is possible to sufficiently diminish the restrictions as to the number of reference signal sequences that can be secured.

Moreover, a reference signal for demodulation/detection of a L1/L2 control signal is allocated a short block SB#1, which is closer in the time direction to a long block LB#1 which the L1/L2 control signal is allocated. Accordingly, it is possible to perform channel estimation used for demodulation of the L1/L2 control signal, with high accuracy.

Further, a CQI estimation reference signal, when it cannot be allocated a short block SB#1, is allocated a short block SB#2, which is closer to the next frame on the time axis. Accordingly, the measurement of channel quality is less susceptible to a processing delay.

Hence, the restrictions as to the number of reference signal sequences that can be secured can be diminished to sufficiently low level, while the accuracy with which a data signal or L1/L2 control signal is demodulated and the accuracy with which channel quality is measured are kept at high level.

The present invention can be applied to radio communications systems and, more particularly, to mobile communications systems employing a scheme of multiplexing reference signals (pilot signals) with data and control signals, as well as to base and mobile stations in such a system, and operation programs for the base and mobile stations.

4. Various Aspects

As described before, the present invention provides a resource allocation method and reference signal multiplexing method that can diminish the restrictions as to the number of reference signal sequences that can be secured, and that can prevent a reduction in the number of reference signals multiplexed, as well as a radio communications system using the methods.

The present invention also provides a resource allocation method and reference signal multiplexing method that enable reference signals with different transmission bandwidths to be efficiently allocated a limited frequency band, as well as a radio communications system using the methods.

The present invention is based on findings such that the size of a resource allocated to a reference signal is changed depending on its use purpose and degree of importance. According to the present invention, high efficient multiplexing of reference signals and diminishing the restrictions as to the number of reference signal sequences can be achieved. For example, a reference signal for demodulation/detection of a data signal or a L1/L2 control signal is multiplexed by distributed FDM over the same bandwidth as the transmission bandwidth of the data signal or L1/L2 control signal. In addition, when a data signal is transmitted, a reference signal for demodulation/detection is multiplexed at a plurality of timings. When a L1/L2 control signal is transmitted, a reference signal for demodulation/detection is multiplexed at a single timing closer in time to the L1/L2 control signal. It should be noted that hereinafter a reference signal for demodulation/detection of a data signal and a reference signal for demodulation/detection of a L1/L2 control signal are simply referred to as "a reference signal for demodulation/detection."

In contrast, a reference signal for channel quality estimation may be multiplexed, independently of data signal or L1/L2 control signal, under the condition of timing and bandwidth allowing effective channel quality measurement within a channel quality measurement range.

In other words, the number of reference signals to be multiplexed by distributed FDM at the same timing for each predetermined frequency block is previously set to a small number so that a sufficiently large number of reference signal sequences can be ensured. Depending on the user purposes and degrees of importance for reference signals, the respective reference signals are multiplexed by time and/or frequency division in a plurality of frequency resources in a plurality of reference signal timings, which will be described later as short blocks SB#1, SB#2. Resource allocation to reference signals at the plurality of reference signal timings will be described hereinafter.

According to the present invention, a resource allocating method in a radio communications system performing allocation of a reference resource, includes: a) allocating a first resource to a reference signal which is used at least for either of demodulation and detection, wherein the first resource is at least part of the reference resource; and b) allocating a second resource to an independent reference signal which is used for processing other than demodulation and detection, wherein the second resource is at least part of the reference resource other than allocated to the reference signal which is used at least for either of demodulation and detection.

Hereafter, a reference signal that is used at least for either of demodulation and detection will be referred to as "a demodulation/detection reference signal." If variations in the channel quality of a corresponding transmission signal within a frame in time domain are not negligible, then the demodulation/detection reference signal is multiplexed by time division at a plurality of reference signal timings over the entire transmission bandwidth of the transmission signal. If variations in the channel quality of a corresponding transmission signal within a frame in time domain are negligible, then the demodulation/detection reference signal is multiplexed by time division at any one of the plurality of reference signal timings.

A channel-quality estimation reference signal which is transmitted independently of demodulation/detection reference signals is multiplexed at one or more timing of the plurality of reference signal timings in one of the following resources:

(1) a frequency resource that is never allocated to a demodulation/detection reference signal;

(2) a frequency resource that can be allocated to a demodulation/detection reference signal and has not been currently occupied by (not currently allocated for) a demodulation/detection reference signal; and (3) a frequency resource that can be allocated to a demodulation/detection reference signal and has been currently occupied by (currently allocated for) a demodulation/detection reference signal but satisfies both of the following conditions A and B:

Condition A) the transmission bandwidth of a CQI estimation reference signal is the same as that of the demodulation/detection reference signal; and Condition B) the number of reference signals to be multiplexed by CDM is smaller than the maximum number of multiplexing.

According to another aspect of the present invention, a reference signal which is transmitted independently of the presence or absence of a data signal and a L1/L2 control signal, or an independent reference signal, is allocated a resource in which at least one of the demodulation/detection reference signals for the data signal and the L1/L2 control signal is not transmitted at the same timing within its transmission band.

More specifically, in a reference signal multiplexing method, the demodulation/detection reference signals for the data signal is allocated a plurality of reference signal resources which are closer in time axis to a resource allocated to the data signal, the demodulation/detection reference signals for the L1/L2 control signal is allocated a single reference signal resource which is closer in time axis to a resource allocated to the L1/L2 control signal, and an independent reference signal is allocated a resource in which at least one of the demodulation/detection reference signals for the data signal and the L1/L2 control signal is not transmitted at the same timing within its transmission band. The demodulation/detection reference signals for the data signal, the demodulation/detection reference signals for the L1/L2 control, signal and the independent reference signal are multiplexed in frequency-division and/or time-division manner.

As described above, according to the present invention, reference signals are multiplexed in frequency-division and/or time-division depending on the usage purpose and importance of the reference signals, whereby a reduction can be achieved in the number of reference signals that are multiplexed by distributed FDM at the same timing in the transmission band of the reference signals. Correspondingly to this reduction, an increase can be achieved in the number of reference signal sequences that can be secured. That is, it is possible to sufficiently diminish the restrictions as to the number of reference signal sequences that can be secured.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A resource allocating method in a radio communications system performing allocation of a reference resource, comprising:

a) allocating a first resource to a first reference signal which is used at least for either of demodulation and detection, wherein the first resource is at least part of the reference resource;

b) allocating a second resource to a second reference signal which is used for processing other than demodulation and detection, wherein the second resource is at least part of the reference resource and is separate from the first resource allocated to the first reference signal; and c) allocating a third resource to a channel-quality estimation reference signal, wherein the third resource currently is occupied for the first reference signal and satisfies both i) a condition A that a transmission bandwidth of the channel-quality estimation reference signal is the same as a bandwidth of the first reference signal, and ii) a Condition B that a number of reference signals to be multiplexed by code division multiplexing (CDM) is smaller than a maximum number of multiplexing, wherein the third resource is at least part of the reference resource, wherein the first resource and the second resource are different parts of the reference resource with different transmission bandwidths matching the first and second reference signals, respectively, and wherein the first resource and another resource of the reference resource are arranged to be within a single reference resource, the another resource being allocated to a transmission signal to be demodulated or detected using the first reference signal, wherein, said allocating steps are applied to blocks within a subframe, said first resource is a first short block within the subframe and is comprised of a first bandwidth and a second bandwidth, said second resource is a second short block within the subframe and is comprised of a third bandwidth equal to a sum of the first and second bandwidths, a first long block comprises a fourth bandwidth and a fifth bandwidth, the fourth bandwidth and the fifth bandwidth each different from each of the first, second, and third bandwidths, the first reference signal includes a demodulation/detection reference signal for a first user equipment allocated to the first bandwidth in the first short block, the first reference signal includes a demodulation/detection reference signal for a second user equipment allocated to the second bandwidth in the first short block, the first reference signal includes a demodulation/detection reference signal for third and fourth user equipments allocated to the first bandwidth in the first short block, the first reference signal includes a demodulation/detection reference signal for fifth and sixth user equipments allocated to the second bandwidth in the first short block, and the second reference signal includes a reference signal for channel quality estimation for a seventh user equipment allocated to the third bandwidth in the second small block.

2. The resource allocating method according to claim 1, wherein the second resource is allocated to the second reference signal when it is possible to multiplex the second resource and the reference resource by either of frequency division multiplexing and code division multiplexing.

3. The resource allocating method according to claim 2, wherein the second resource is at least one of a resource that is never allocated to a reference signal which is used at least for either of demodulation and detection;

a resource that can be allocated to a reference signal which is used at least for either of demodulation and detection and has not been currently allocated to a reference signal which is used at least for either of demodulation and detection; and a resource that has been currently allocated to a reference signal which is used at least for either of demodulation and detection, wherein a number of reference signals to be multiplexed in said resource by code division multiplexing is smaller than a maximum multiplexing limit.

4. The resource allocating method according to claim 2, wherein a plurality of reference resources are provided at different timings for every frame, wherein the first resource is included in a first reference resource, wherein a first determination whether the second resource to be allocated to the second reference signal is made at a timing later than the first reference resource for every frame.

5. The resource allocating method according to claim 1, wherein the first reference signal to which the reference resource is allocated uses a sequence in which a number of sequences that can be secured depends on its sequence length.

6. A device comprising a transmitter and a processor which implements a computer-readable program instructing the device to function as a resource allocating device in a radio communications system performing allocation of a reference resource, comprising:

a) allocating a first resource to a first reference signal which is used at least for either of demodulation and detection, wherein the first resource is at least part of the reference resource;

b) allocating a second resource to an second reference signal which is used for processing other than demodulation and detection, wherein the second resource is at least part of the reference resource and is separate from the first resource allocated to the first reference signal; and c) allocating a third resource to a channel-quality estimation reference signal, wherein the third resource currently is occupied for the first reference signal and satisfies both i) a condition A that a transmission bandwidth of the channel-quality estimation reference signal is the same as a bandwidth of the first reference signal, and ii) a Condition B that a number of reference signals to be multiplexed by code division multiplexing (CDM) is smaller than a maximum number of multiplexing, wherein the first resource and the second resource are different parts of the reference resource with different transmission bandwidths matching the first and second reference signals, respectively, and wherein the first resource and another resource of the reference resource are arranged to be within a single reference resource, the another resource being allocated to a transmission signal to be demodulated or detected using the first reference signal, wherein, said allocating steps are applied to blocks within a subframe, said first resource is a first short block within the subframe and is comprised of a first bandwidth and a second bandwidth, said second resource is a second short block within the subframe and is comprised of a third bandwidth equal to a sum of the first and second bandwidths, a first long block comprises a fourth bandwidth and a fifth bandwidth, the fourth bandwidth and the fifth bandwidth each different from each of the first, second, and third bandwidths, the first reference signal includes a demodulation/detection reference signal for a first user equipment allocated to the first bandwidth in the first short block, the first reference signal includes a demodulation/detection reference signal for a second user equipment allocated to the second bandwidth in the first short block, the first reference signal includes a demodulation/detection reference signal for third and fourth user equipments allocated to the first bandwidth in the first short block, the first reference signal includes a demodulation/detection reference signal for fifth and sixth user equipments allocated to the second bandwidth in the first short block, physical layer/data link layer (L1/L2) control signals for the third and fourth user equipments are allocated to the fourth bandwidth in the first long block, physical layer/data link layer (L1/L2) control signals for the fifth and sixth user equipments are allocated to the fifth bandwidth in the first long block, the second reference signal includes a reference signal for channel quality estimation for a seventh user equipment allocated to the third bandwidth in the second small block, and the first short block is arranged to be adjacent in time to the first long block, the first long block including the physical layer/data link layer (L1/L2) control signals to be demodulated or detected by a corresponding one of the demodulation/detection reference signals in the first short block.

7. The resource allocating method according to claim 1, wherein, physical layer/data link layer (L1/L2) control signals for the third and fourth user equipment are allocated to the fourth bandwidth in the first long block, physical layer/data link layer (L1/L2) control signals for the fifth and sixth user equipment are allocated to the fifth bandwidth in the first long block, and the first short block is arranged to be adjacent in time to the first long block, the first long block including the physical layer/data link layer (L1/L2) control signals to be demodulated or detected by a corresponding one of the demodulation/detection reference signals in the first short block.

* * * * *